United States Patent
Takahashi

(10) Patent No.: US 9,132,365 B2
(45) Date of Patent: Sep. 15, 2015

(54) REMOVAL METHOD AND REMOVAL APPARATUS FOR ENTRAINED AIR COATING FLUID

(75) Inventor: Naoto Takahashi, Shunan (JP)

(73) Assignee: TOKUYAMA CORPORATION, Shunan-Shi (JP)

(*) Notice: Subject to any disclaimer, the term of this patent is extended or adjusted under 35 U.S.C. 154(b) by 10 days.

(21) Appl. No.: 13/533,236

(22) Filed: Jun. 26, 2012

(65) Prior Publication Data

US 2012/0325090 A1 Dec. 27, 2012

Related U.S. Application Data

(62) Division of application No. 12/083,728, filed as application No. PCT/JP2006/320979 on Oct. 16, 2006, now abandoned.

(30) Foreign Application Priority Data

Oct. 20, 2005 (JP) .................. 2005-306169

(51) Int. Cl.
*B01D 19/00* (2006.01)
*B05D 1/26* (2006.01)
*G02B 5/23* (2006.01)

(52) U.S. Cl.
CPC ........ *B01D 19/0063* (2013.01); *B01D 19/0052* (2013.01); *B01D 19/0057* (2013.01); *B05D 1/26* (2013.01); *G02B 5/23* (2013.01)

(58) Field of Classification Search
CPC ........... B01D 19/0052; B01D 19/0063; B01D 19/0057; G02B 5/23; B05D 1/26
USPC ............. 427/164; 95/258, 202, 203, 262, 261
See application file for complete search history.

(56) References Cited

U.S. PATENT DOCUMENTS

| 6,296,707 B1 | 10/2001 | Adamczyk et al. |
| 2005/0258282 A1* | 11/2005 | Hagihara ................. 239/571 |
| 2007/0002681 A1* | 1/2007 | Vanderbilt et al. ............ 366/217 |

FOREIGN PATENT DOCUMENTS

| JP | 8-112559 A | 5/1996 |
| JP | 10-24231 A | 1/1998 |
| JP | 2000-334369 A | 12/2000 |
| JP | 2002-96021 A | 4/2002 |
| JP | 2003-290642 A | 10/2003 |
| JP | 2005-13873 A | 1/2005 |
| JP | 2005-218994 A | 8/2005 |

OTHER PUBLICATIONS

Nobutaka (JP 2002-96021 (Machine Translation Provided)).*
Extended European Search Report issued Dec. 12, 2011 in corresponding European Patent Application No. 06812105.2.
International Search Report for PCT/JP2006/320979 issued Jan. 30, 2007.
Office Action issued Mar. 26, 2012 in U.S. Appl. No. 12/083,728.
Office Action issued Oct. 6, 2011 in U.S. Appl. No. 12/083,728.

* cited by examiner

*Primary Examiner* — Alison Hindenlang
*Assistant Examiner* — Robert J Grun
(74) *Attorney, Agent, or Firm* — Birch, Stewart, Kolasch & Birch, LLP

(57) ABSTRACT

The present invention has as an object to render a photochromic coating layer free from air bubbles and obtain a uniform layer without film thickness unevenness in the coating layer. In the prevent invention, entrained air in a coating fluid stored in a vessel of a coating unit comprising the vessel, a check valve for preventing back-flow of the coating fluid connected to the vessel, and optionally an ejection nozzle connected to the check valve; air existing inside of the check valve; and optionally air existing inside of the ejection nozzle are removed by plugging an outlet of the coating fluid existing downstream of the check valve and then rotating the coating unit on an axis of the vessel and orbiting the coating unit on a revolution axis simultaneously.

6 Claims, 19 Drawing Sheets

Fig. 19
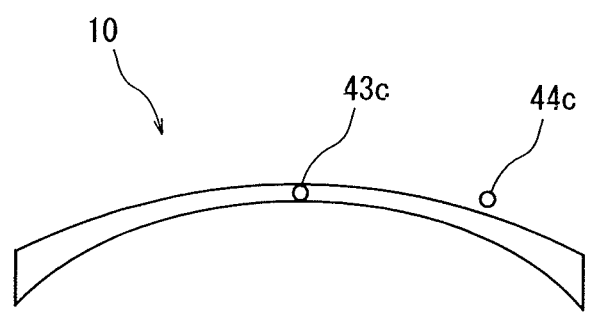
A
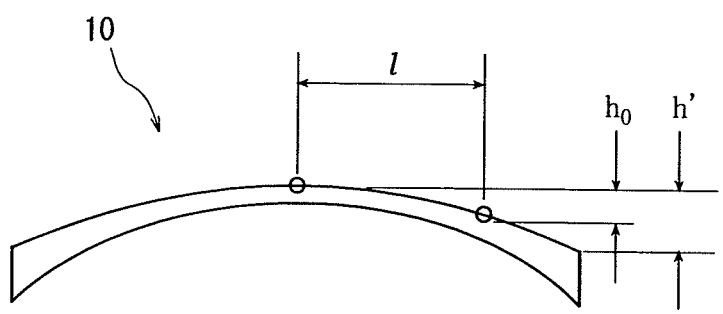
B

REMOVAL METHOD AND REMOVAL APPARATUS FOR ENTRAINED AIR COATING FLUID

This application is a Divisional of U.S. patent application Ser. No. 12/083,728, filed Sep. 12, 2008, now abandoned which is the U.S. National Phase of PCT/JP2006/320979, filed Oct. 16, 2006. Priority is claimed thereto under 35 U.S.C. §120. This application also claims priority under 35 U.S.C. §119(a) to Japanese patent Application No. 2005-306169, filed in Japan on Oct. 20, 2005. The entire contents of all are herein incorporated by reference.

TECHNICAL FIELD

This invention relates to a method for removing air entrained in a coating fluid stored in a container called a coating unit, and a removal apparatus for use in its removal.

BACKGROUND ART

Among materials which change in color when exposed to light is a photochromic material. The photochromic substance has the property that its structure reversibly changes according to the presence or absence of ultraviolet radiation to change in absorption spectrum. This property results from the nature that when an isomer is irradiated with light of a particular wavelength, the single chemical substance, under the action of light, reversibly produces an isomer having a different absorption spectrum. The resulting different isomer is restored to the color of the original isomer by heat or light of a different wavelength.

Photochromic spectacles utilize the above nature of the photochromic material for lenses. In an outdoor environment exposed to light including ultraviolet radiation, such as sunlight, the lenses are rapidly colored to function as sunglasses. In an indoor environment without exposure to light, the lenses fade to function as ordinary transparent spectacles.

Known methods for producing a lens having photochromic property include a method of impregnating the surface of a non-photochromic lens with a photochromic coating fluid; a method which comprises dissolving a photochromic coating fluid in a monomer, and polymerizing the solution to obtain a photochromic lens directly; and a method comprising providing a layer having photochromic property on the surface of a lens with the use of a coating agent containing a photochromic compound (namely, a coating method). An apparatus for forming a layer having photochromic property on a lens by the coating method is disclosed.

In the above-described coating method, when the photochromic coating fluid is supplied onto the lens, the photochromic fluid is ejected from the nozzle of a vessel containing the photochromic fluid to the surface of the lens to form a coating layer on the surface of the lens.

However, the photochromic fluid has viscosity, so that if air is entrained in the fluid, air bubbles are formed in the resulting coating layer. The nozzle of the vessel is provided with a check valve for preventing fluid dripping. In this case, air may be incorporated in the nozzle at the start of operation, thus requiring that air in the nozzle be discharged outside before start of the operation. For this purpose, air purge of the nozzle is performed using the coating fluid. This poses the problem of a great expenditure, because the photochromic fluid is expensive.

The present invention has been accomplished in the light of such circumstances. It is an object of the invention to provide a removal method for entrained air in a coating nozzle, and a coating apparatus, the removal method and the coating apparatus unable to form an uniform photochromic coating film without voids and thickness unevenness.

In connection with the present invention, technologies such as the technology described in Japanese Unexamined Patent Publication No. 2000-334369 concerning with an apparatus which can coat a plurality of lenses continuously, the technology described in Japanese Unexamined Patent Publication No. 2005-013873 concerning with an apparatus equipped with an auxiliary mechanism for spreading a coating fluid on a lens with the use of a flexible film, and the technology described in Japanese Unexamined Patent Publication No. 2005-218994 concerning with an apparatus which adjusts the rotational state of a lens according to the shape of the lens or the viscosity of a coating fluid are available.

DISCLOSURE OF THE INVENTION

The method for removing air from a coating fluid containing entrained air according to the present invention (hereinafter referred to as the removal method for entrained air according to the present invention) comprising the steps of:

(A) preparing a coating unit comprising a cylindrical vessel storing the coating fluid and a check valve for preventing back-flow of the coating fluid connecting with the vessel;

(B) plugging an outlet of the coating fluid existing downstream of the check valve; and (C) rotating the coating unit on an axis of the vessel and orbiting the coating unit on a revolution axis simultaneously whereby introducing the coating fluid into the check valve, discharging air resided inside of the check valve toward the vessel, and further removing air incorporated in the coating fluid from the coating fluid.

In the present invention described above, the coating unit prepared in the step (A) further can contain an ejection nozzle for ejecting the coating fluid connecting with the check valve. In such a case, the plugging in the step (B) is carried out by plugging an outlet of the ejection nozzle, and the coating fluid is introduced into the check valve and the ejection nozzle, and the air inside the check valve and the air inside the ejection nozzle are discharged toward the vessel in the step (C). Meanwhile, the air inside the ejection nozzle is not discharged when the deaeration was carried out using the coating unit without the ejection nozzle and the ejection nozzle was loaded after the deaeration.

In the present invention, the rotational speed of revolution of the coating unit is preferably set such that the speed in the late stage of a rotating operation is rendered higher than the speed in the early stage of the rotating operation.

In the present invention, the coating fluid can be a photochromic coating fluid to be coated on the surface of spectacles.

The removal apparatus for entrained air in a coating fluid according to the present invention (hereinafter referred to as the removal apparatus for entrained air or deaeration apparatus of the present invention) comprises a casing which can rotate on a rotation axis and also can orbit on revolution axis, and a coating unit comprising a cylindrical vessel accommodating a coating fluid inside, a check valve for preventing back-flow of the coating fluid connecting the vessel and a lid for plugging an outlet of the coating fluid existing downstream of the check valve; wherein the rotation axis being located, with respect to the revolution axis, outwardly and downwardly in a circumferential direction of an orbital on the revolution axis, the coating unit being supported by the casing detachably such that the lid of the coating unit is located below, and the coating unit being rotated on the rotation axis and being orbit on the revolution axis simultaneously with the casing, to discharge air resided inside of the check valve toward the vessel, and further to remove air incorporated in the coating fluid.

The coating fluid used in the present invention can be a photochromic coating fluid to be coated on the surface of spectacles.

In the present invention, a flange facing outward can be formed on the periphery of the vessel, and the flange can be detachably mounted on the casing.

BRIEF DESCRIPTION OF THE DRAWINGS

FIG. 19A is a sectional view of a state in which the height of the lens is measured with laser light from the lens height measuring sensor shown in FIG. 10. FIG. 19B is a sectional view for illustrating how to lead to the edge position of the lens.

BEST MODE FOR CARRYING OUT THE INVENTION

An embodiment of a removal method for entrained air in a coating fluid according to the present invention will now be described with reference to the accompanying drawings.

Figure 1:
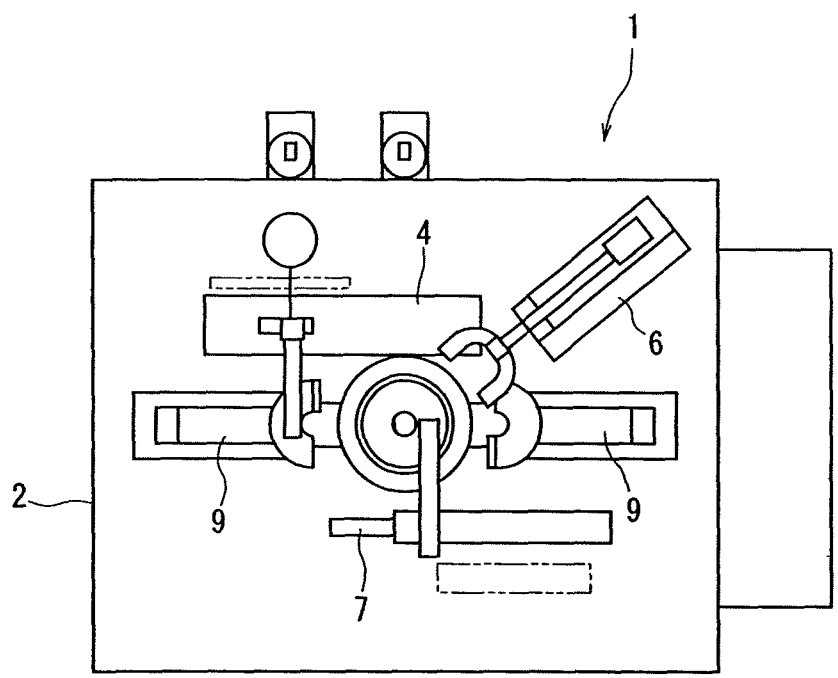
FIG. 1 is a plan view of a photochromic coating apparatus described in an embodiment of the present invention.
Figure 2:
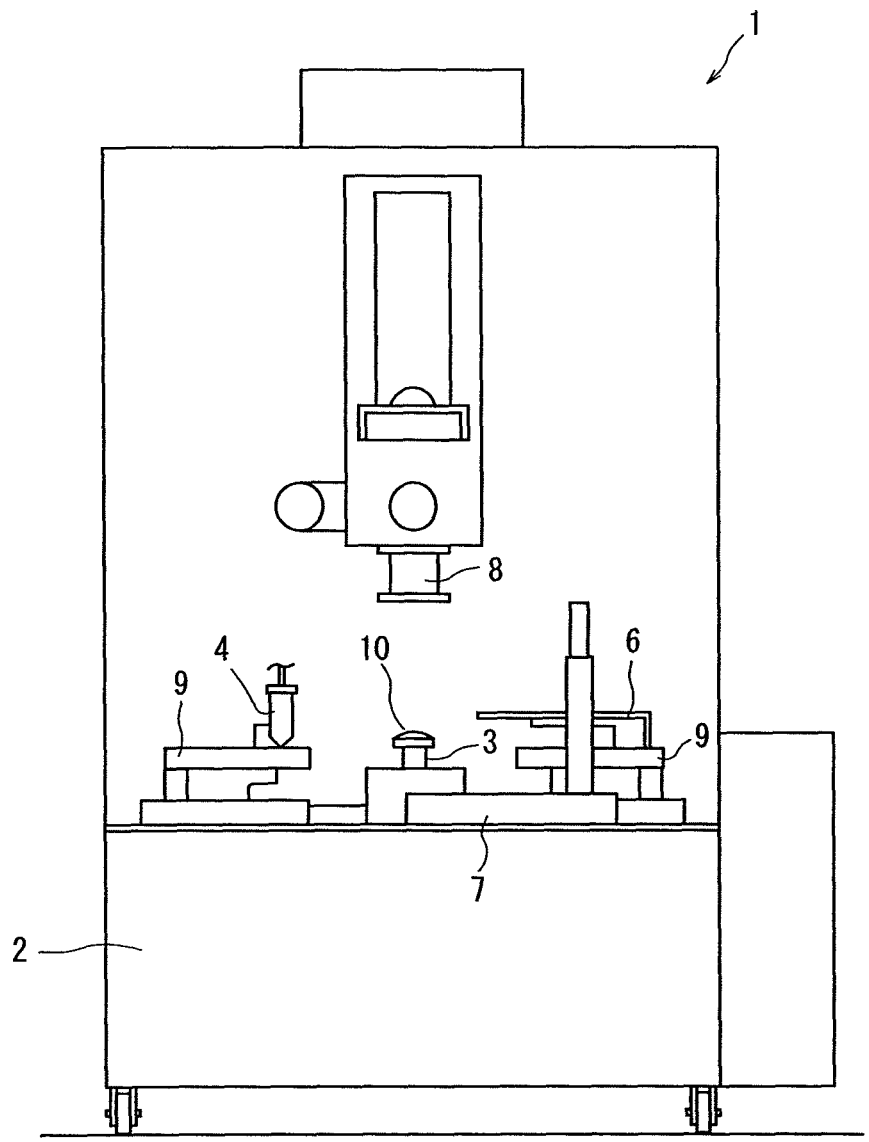
FIG. 2 is a front view of the photochromic coating apparatus of FIG. 1.

FIGS. 1 and 2 show a photochromic coating apparatus for coating a photochromic fluid onto a lens under automatic control. The lower side of the photochromic coating apparatus in FIG. 1 is the front side of the apparatus (in the Y-axis direction), and the right-to-left side of the apparatus is in the lateral direction (X-axis direction).

A photochromic coating apparatus 1 has a lens support device 3, a coating unit support device 4, a lens height measuring sensor 6, a coating film uniformizing device 7, a UV device 8, and a movable fluid receiving device 9 provided on a base stand 2.

Figure 3:
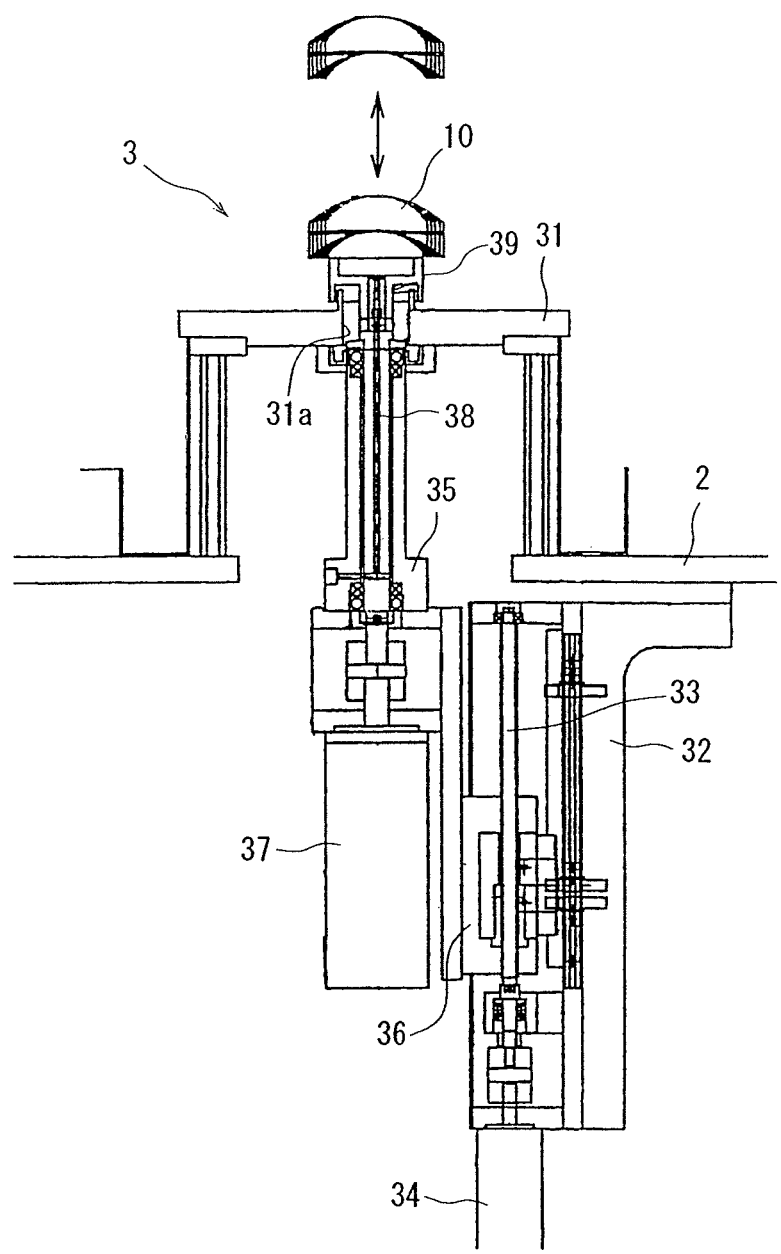
FIG. 3 is a longitudinal (in the up-and-down direction; the same applies hereinafter) sectional view of a lens support device in the photochromic coating apparatus of FIG. 1.

As shown in FIG. 3, the lens support device 3 is provided in a nearly central portion of the base stand 2, and has a circular pedestal 31 formed to protrude upward from the base stand 2. A guide member 32 is provided inwardly of the base stand 2, and a Z-axis ball screw 33 having an axis pointing in the up-and-down (vertical) direction is provided on the guide member 32. The Z-axis ball screw 33 has an upper end portion rotatably mounted on the guide member 32, and a lower end portion mounted on a servo motor 34. A Z-axis ball nut 36 mounted on a lens support member 35 is screwed to the Z-axis ball screw 33. As the Z-axis ball screw 33 is rotated, the lens support member 35 can move upward and downward along the Z-axis ball screw 33. A servo motor 37 is fixed to a lower portion of the lens support member 35, and a rotating shaft 38 extending upward is mounted on the servo motor 37. The rotating shaft 38 passes through a hole 31a formed in the circular pedestal, and a lens support stand 39 is mounted on a front end portion of the rotating shaft 38. When the servo motor 37 is rotated, the lens support stand 39 rotates about the rotating shaft 38.

Figure 4:
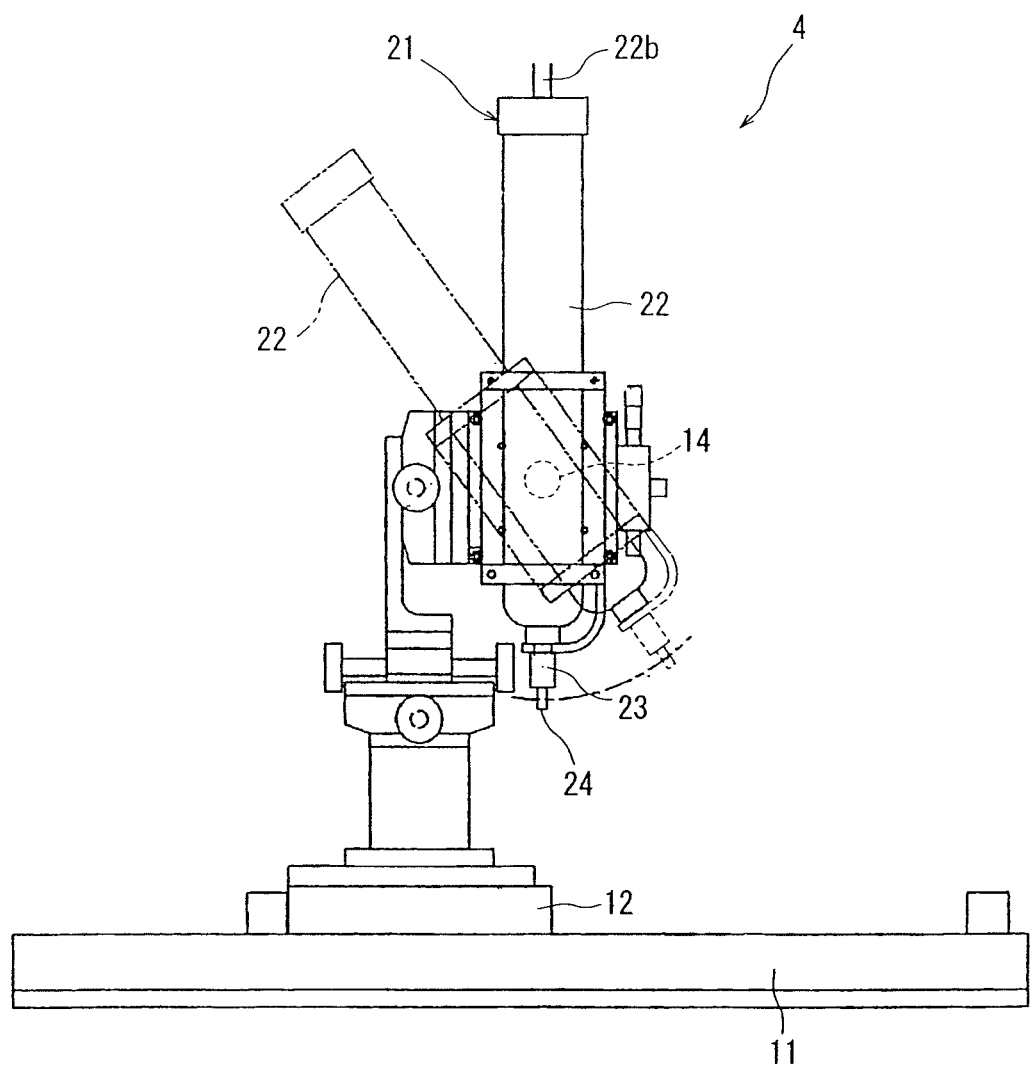
FIG. 4 is a front view of a coating unit support device in the photochromic coating apparatus of FIG. 1.
Figure 5:
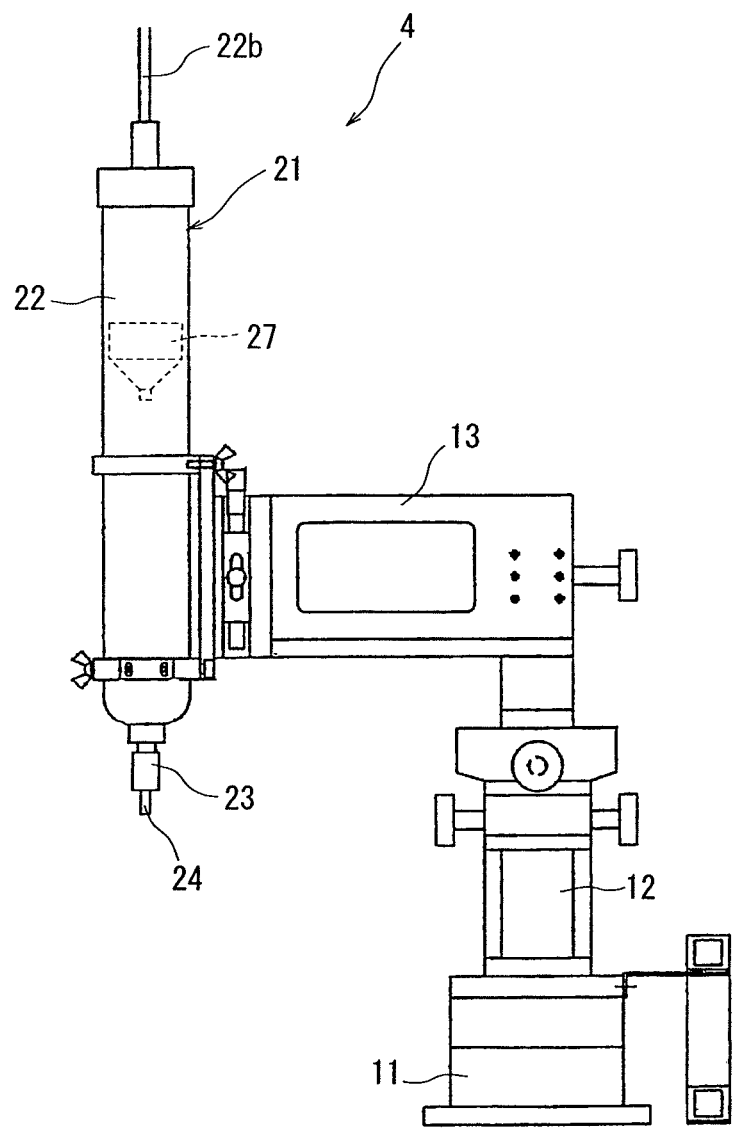
FIG. 5 is a side view of the coating unit support device of FIG. 4.

FIGS. 4 and 5 show the coating unit support device 4. In the coating unit support device 4, an air slide table 11 is provided on the base stand 2, and a slide block 12 is fitted onto the slide table 11 to be slidable in the lateral direction of the photochromic coating apparatus 1. The slide block 12 is slidable by a rodless cylinder, and the rodless cylinder of the air type, chain type, magnet type, slit type, or wire type can be applied (the same is true of rodless cylinders to follow).

A support arm 13 extending toward the front side of the base stand 2 is mounted on an upper end portion of the slide block 12 erected upward, and a coating unit 21 is supported by the support arm 13. The support arm 13 is mounted such that the support angle of the coating unit 21 can be changed about a pivot shaft 14 as an axis. That is, as shown in FIG. 4, the support arm 13 can support the coating unit 21 in an upright posture, or in an inclined state as indicated by imaginary lines. The coating unit 21 can be moved to directly above the center of a lens 10 by the lateral slide of the slide block 12 on the air slide table 11.

Figure 6:
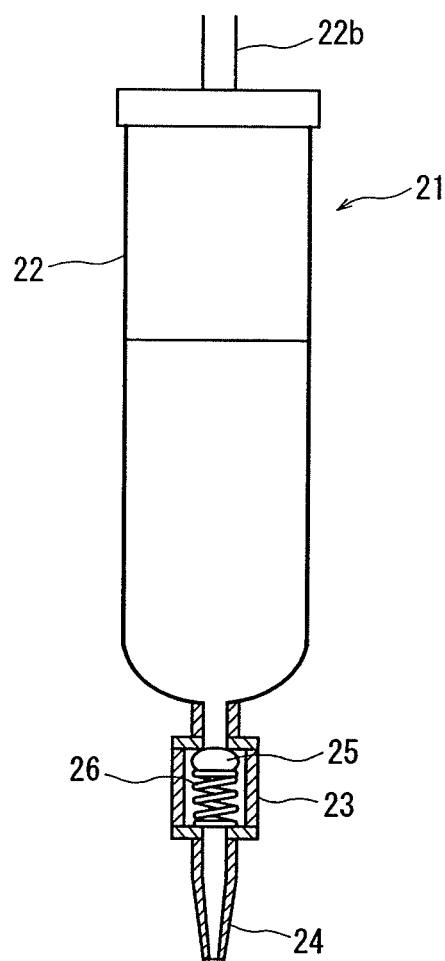
FIG. 6 is a longitudinal sectional view of a coating unit supported by the photochromic coating apparatus of FIG. 4.

As shown in FIG. 6, the coating unit 21 is equipped with a vessel 22, a check valve (a fluid drip preventing valve) 23, and a nozzle 24. A coating fluid is contained in the vessel 22, the upper end of the check valve 23 is detachably connected to a lower portion of the vessel 22, and the nozzle 24 is detachably connected to the lower end of the check valve 23.

Figure 7:
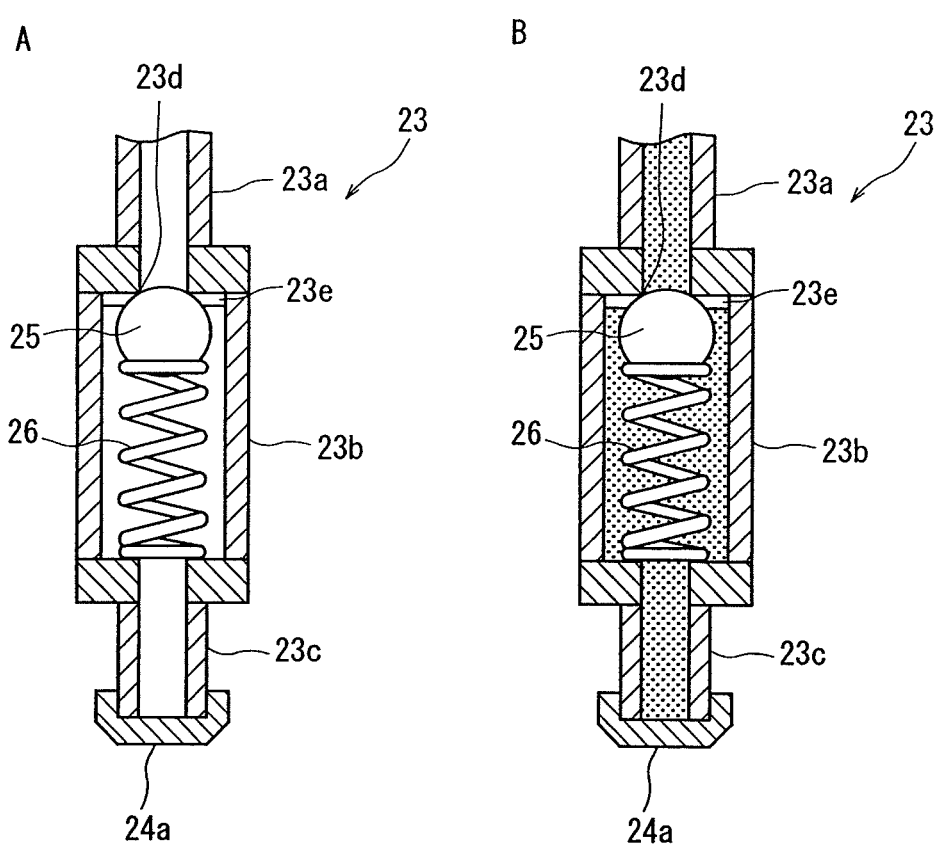
FIG. 7A is a longitudinal sectional view, before deaeration, of a fluid drip preventing valve (the check valve) mounted in the vicinity of an outlet of the coating unit of FIG. 6.
FIG. 7B is a longitudinal sectional view, after deaeration, of the fluid drip preventing valve.

As shown in FIGS. 7A, 7B, the check valve 23 has a first small-diameter portion 23a on its upper end side connected to the vessel 22, a large-diameter portion 23b at its center, and a second small-diameter portion 23c at the leading end side thereof. A valve seat 23d, where a cushioning material 23e such as an O-ring is disposed, is formed at the boundary between the first small-diameter portion 23a and the large-diameter portion 23b. A valve ball 25 of a spherical shape is disposed in the large-diameter portion 23b, and a spring 26 is disposed in a compressed state between the valve ball 25 and the second small-diameter portion 23c.

A plunger 27 is disposed inside the vessel 22, and when a compression source (N2) connected to piping 22b imposes a load, the plunger 27 presses the coating fluid to open the valve composed of the valve seat 23d and the valve ball 25. In this manner, the valve ball 25 is urged against the valve seat 23d by the spring 26 to restrain the flow of the coating fluid from the nozzle 24 toward the vessel 22. On the other hand, when the valve ball 25 is pressed in opposition to the force of the spring 26, the flow of the coating fluid from the vessel 22 toward the nozzle 24 is allowed.

An explanation will be offered for a removal apparatus 15 according to the present invention for removing air (air bubbles) contained in the coating fluid accommodated in the coating unit 21.

Figure 8:
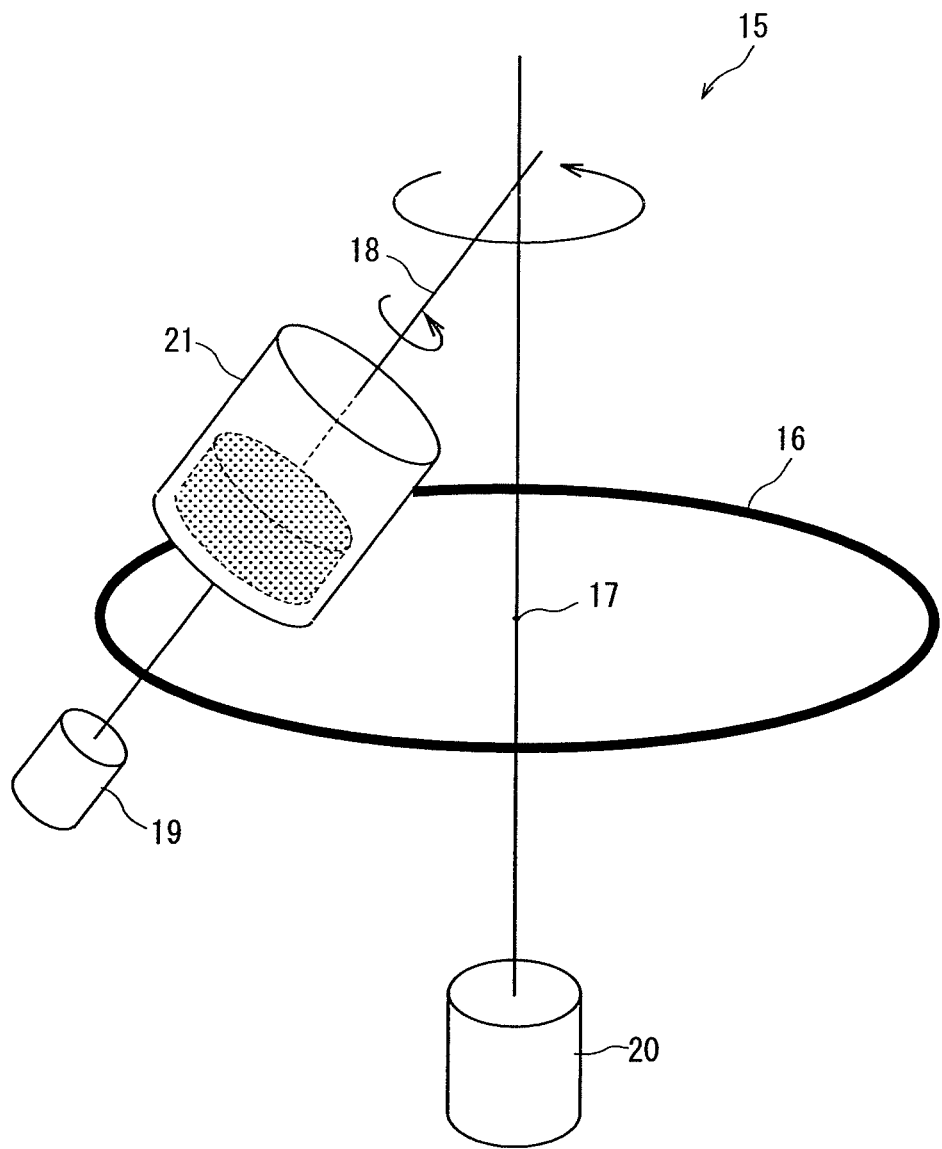
FIG. 8 is a schematic view of a removal apparatus according to the embodiment of the present invention.
Figure 9:
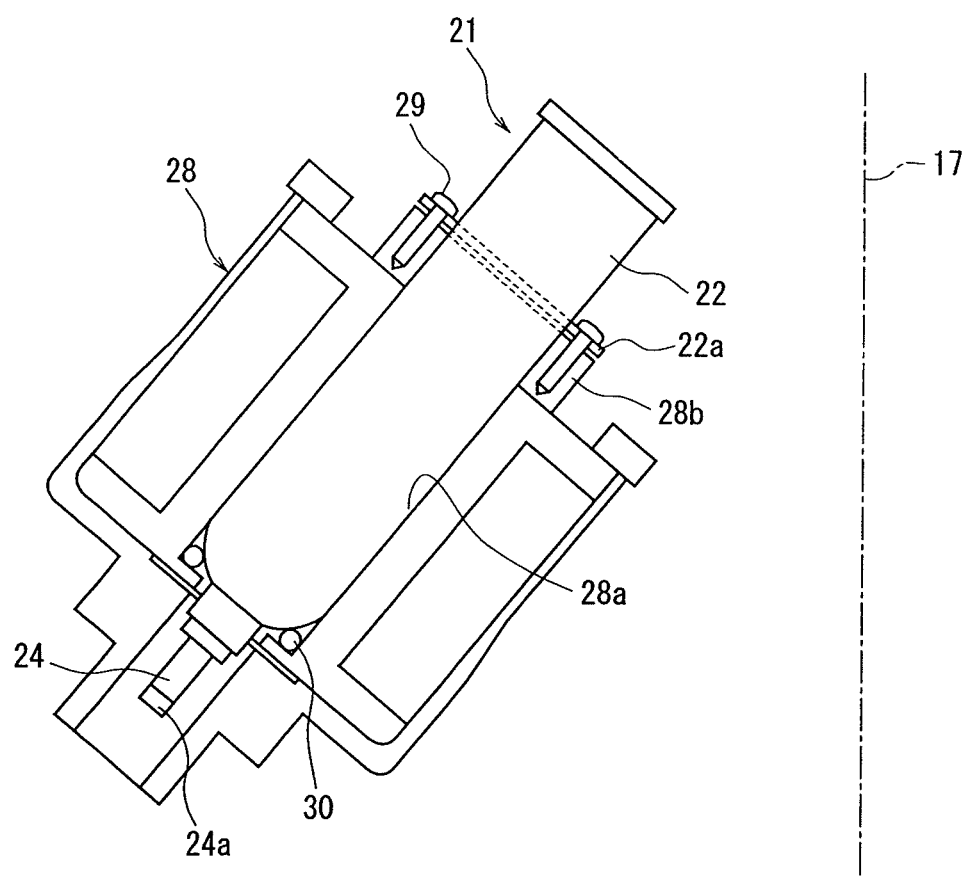
FIG. 9 is a sectional view of a state in which the coating unit of FIG. 6 is supported by the casing.

The removal apparatus 15 shown in FIG. 8 is provided separately from the photochromic coating apparatus 1. Before the coating unit 21 is set in the coating unit support device 4, deaeration treatment is performed by the removal apparatus 15. The removal apparatus 15 is provided with a rotating body 16, and the rotating body 16 can be rotated on an axis of rotation (a revolution axis) 17. A casing 28 for supporting the coating unit 21, as shown in FIG. 9, is arranged at a position remote from the center of the rotating body 16. A hole 28a is formed in a central portion of the casing 28, and the coating unit 21 can be detachably mounted in the hole 28a. An annular boss portion 28b is formed on the upper surface of the casing 28 above the hole 28a, and a rubber packing 22a is mounted on the boss portion 28b by screws 29. The rubber packing 22a is mounted to suppress the freewheeling of the vessel 22 of the coating unit 21 by making contact with the periphery of the vessel 22 when the coating unit 21 is rotated by the removal apparatus 15. An O-ring 30 as a cushioning material is disposed at the bottom of the hole 28a into which the coating unit 21 is inserted.

The coating unit 21 has an axis (a rotation axis) 18 inclined in the up-and-down direction within the casing 28. A lower portion of the coating unit 21 is directed toward the outer periphery of the rotating body 16, while an upper portion of the coating unit 21 is directed toward the upper side of the axis of rotation (the revolution axis) 17 of the rotating body 16. The ejection nozzle 24 is provided at a leading end portion of the coating unit 21, and a lid 24a is mounted on the outlet of the ejection nozzle 24.

The casing 28 is adapted to be rotated by a drive motor 19 on the axis (the rotation axis) 18 together with the coating unit 21. The rotating body 16 is arranged to be rotated or orbited by a drive motor 20 on the axis of rotation (the revolution axis) 17. The coating unit 21 can do orbital motion or revolution which means orbiting on a revolution axis on the revolution axis 17, and can rotate on the rotation axis 18 which corresponding with an axis of the vessel 22.

Figure 10:
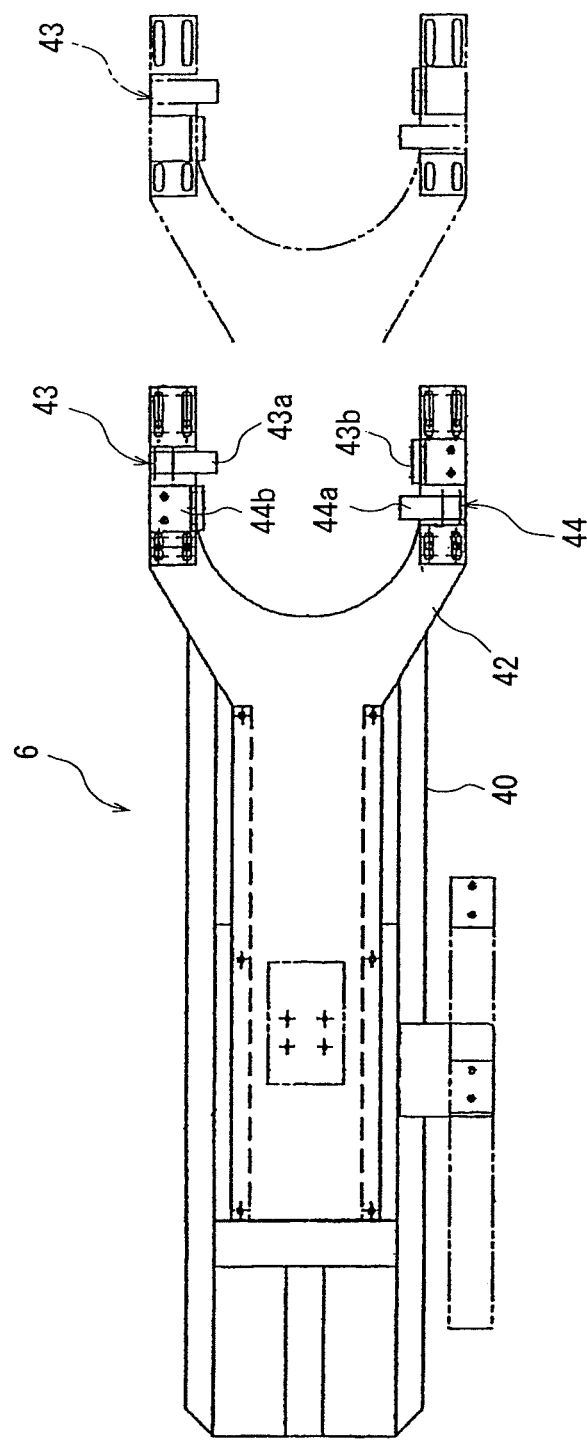
FIG. 10 is a plan view of a lens height measuring sensor in the photochromic coating apparatus of FIG. 1.
Figure 11:
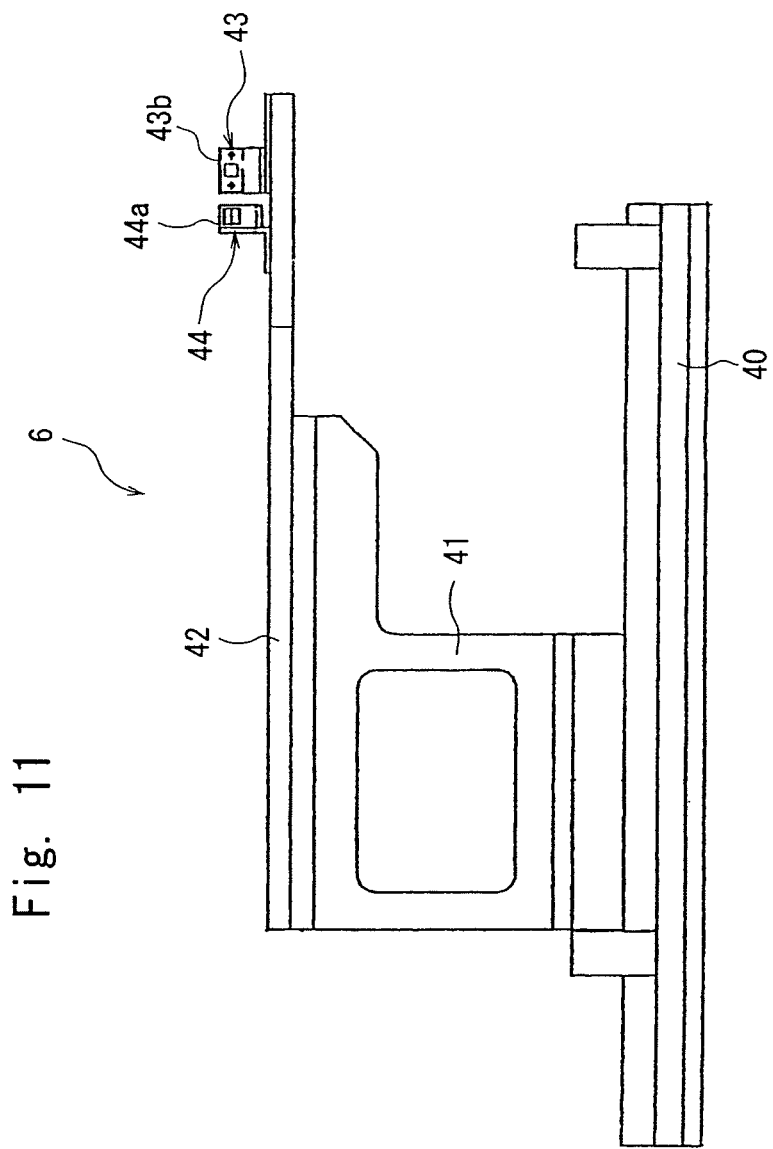
FIG. 11 is a side view of the lens height measuring sensor of FIG. 10.

FIGS. 10 and 11 show the lens height measuring sensor 6.

The lens height measuring sensor 6 is provided with a slide plate 40 serving as a base stand. The slide plate 40 is disposed such that its leading end side faces toward the lens support member 35, its rear end side faces toward a corner portion of the photochromic coating apparatus 1, and the slide plate 40 is provided nearly on diagonals of the photochromic coating apparatus 1 of a generally rectangular shape. A slide block 41, which can move back and forth on the slide plate 40, is provided on top of the slide plate 40. A sensor-mounting member 42 of a U-shape is provided on the slide block 41, and two sensors 43 and 44 are disposed in opposite side end portions of the sensor-mounting member 42 which confront each other. The sensor units 43, 44 have sensors 43a, 44a each having a light emitting portion and a light receiving portion. The light emitting portion emits laser light, mirrors 43b, 44b reflect the laser light, and the sensors 43a, 44a can detect the reflected laser light.

The sensor units 43, 44 comprise the sensors 43a, 44a and the mirrors 43b, 44b disposed to be staggered and opposed. A line connecting one sensor 43a and one mirror 43b, and a line connecting the other sensor 44a and the other mirror 44b are arranged at the same horizontal height position and in parallel. The lens 10 is placed between the sensors 43a, 44a and the mirrors 43b, 44b. The sensor units 43, 44 detect the presence of the lens 10 such that when the lens 10 is placed between the sensors 43a, 44a and the mirrors 43b, 44b, light is crooked by the lens 10 and thereby blocked.

Figure 12:
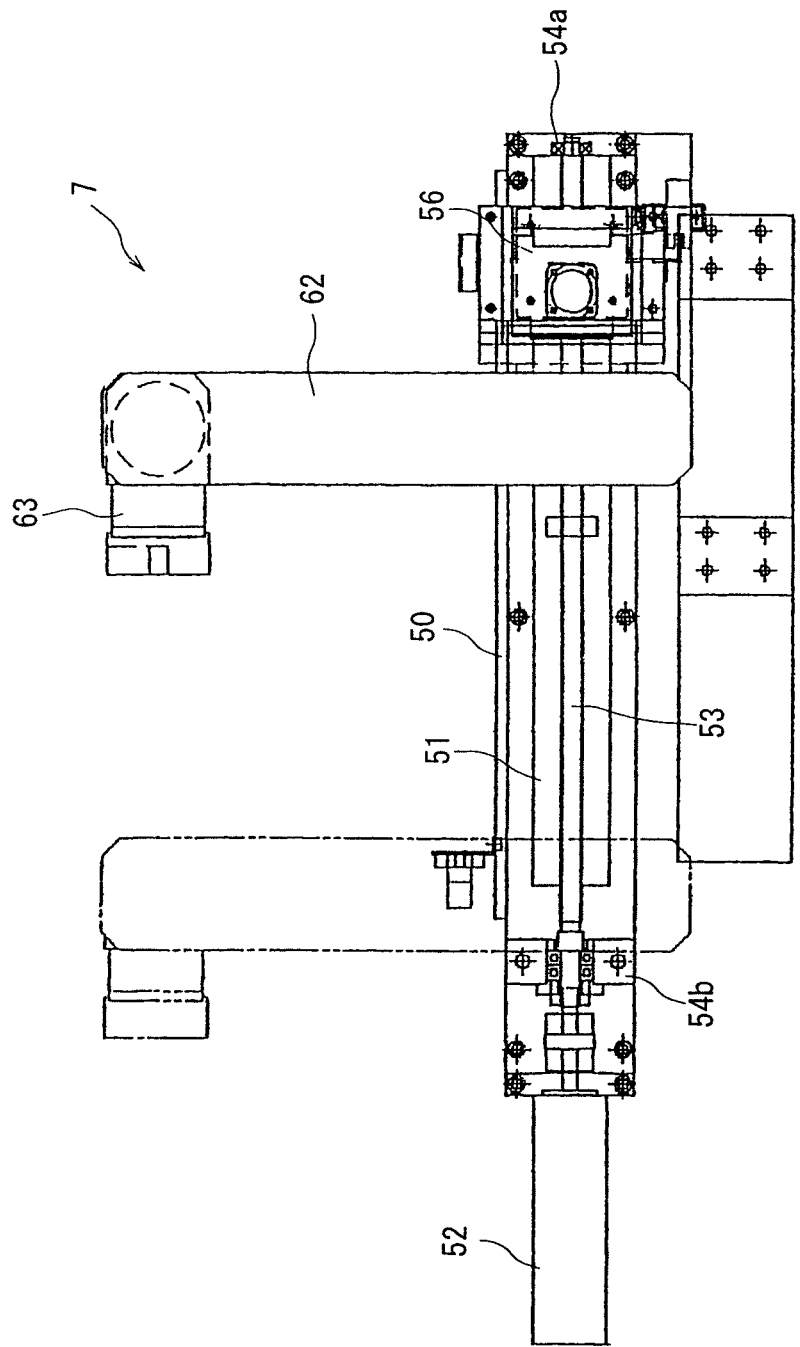
FIG. 12 is a plan view of a coating film uniformizing device in the photochromic coating apparatus of FIG. 1.
Figure 13:
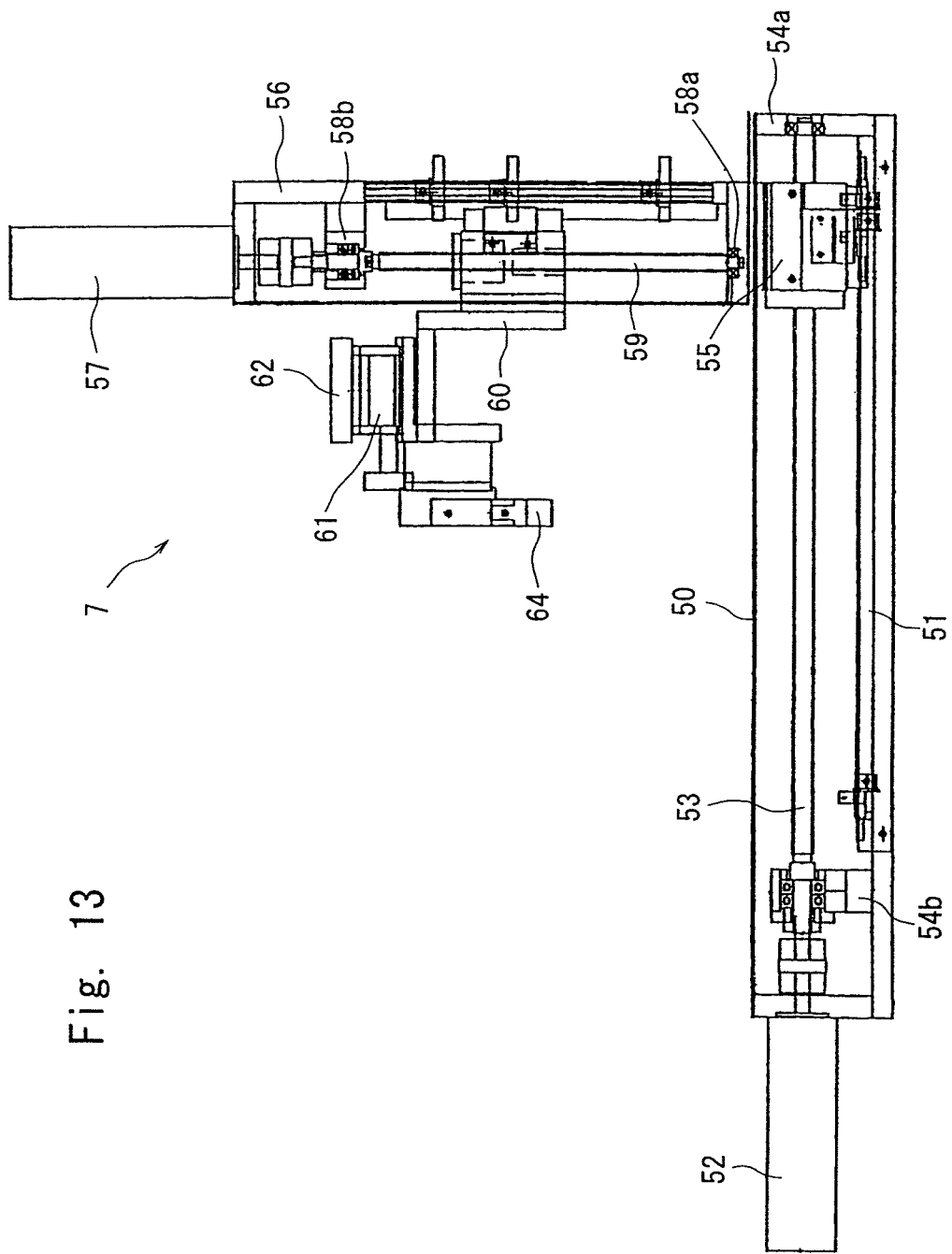
FIG. 13 is a plan view of the coating film uniformizing device of FIG. 12.

FIGS. 12 and 13 show the coating film uniformizing device 7.

The coating film uniformizing device 7 has a linear block 50 provided on the base stand 2. In the linear block 50, a linear rail 51 extends in the lateral direction of the photochromic coating apparatus 1. An X-axis servo motor 52 is mounted on one end side of the linear block 50, and an X-axis ball screw 53 journaled by bearings 54a, 54b is rotatably mounted on the X-axis servo motor 52. An X-axis ball nut 55 is screwed to the X-axis ball screw 53, and as the servo motor 52 is rotated, the X-axis ball nut 55 can be moved laterally. A longitudinal linear block 56 erected upward is mounted on the X-axis ball nut 55.

A servo motor 57 is mounted on an upper portion of the longitudinal linear block 56, and a Z-axis ball nut 60 is screwed to a Z-axis ball screw 59 journaled by bearings 58a and 58b. An elevating stage 61 is mounted on the Z-axis ball nut 60. When the servo motor 57 rotates, the elevating stage 61 can move up and down. An arm 62 extending toward the lens support member 35 is provided on the elevating stage 61, and a support bracket 63 is provided at a leading end portion of the arm 62. A flexible film 64, which is made of resin such as PET and aims to uniformize the thickness of a film of the photochromic coating fluid, is suspended from the support bracket 63. When the elevating stage 61 is moved in the lateral direction by driving the X-axis servo motor 52, the film 64 travels in a radial trajectory on the center of the lens 10.

Figure 14:
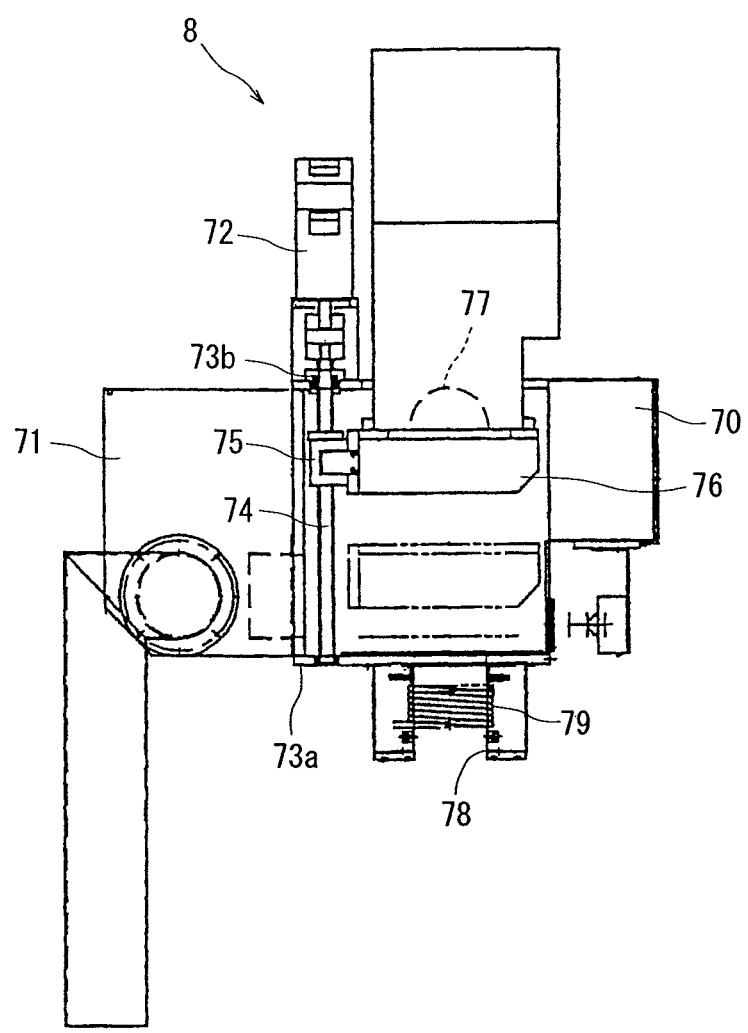
FIG. 14 is a side view of a UV device in the photochromic coating apparatus of FIG. 1.

FIG. 14 shows the UV device 8.

The UV device 8 has a main block 70 which can be raised and lowered in the up-and-down direction by an elevating means (not shown). A UV elevating unit 71 is provided in the main block 70, and a servo motor 72 is mounted on the UV elevating unit 71. A Z-axis ball nut 75 is screwed to a Z-axis ball screw 74 journaled by bearings 73a and 73b. A UV elevating stage 76 is mounted on the Z-axis ball nut 75. The UV elevating stage 76 moves up and down in accordance with the rotation of the servo motor 72. A UV light 77 to be disposed directly above the lens 10 is provided on the UV elevating stage 76.

Figure 15:
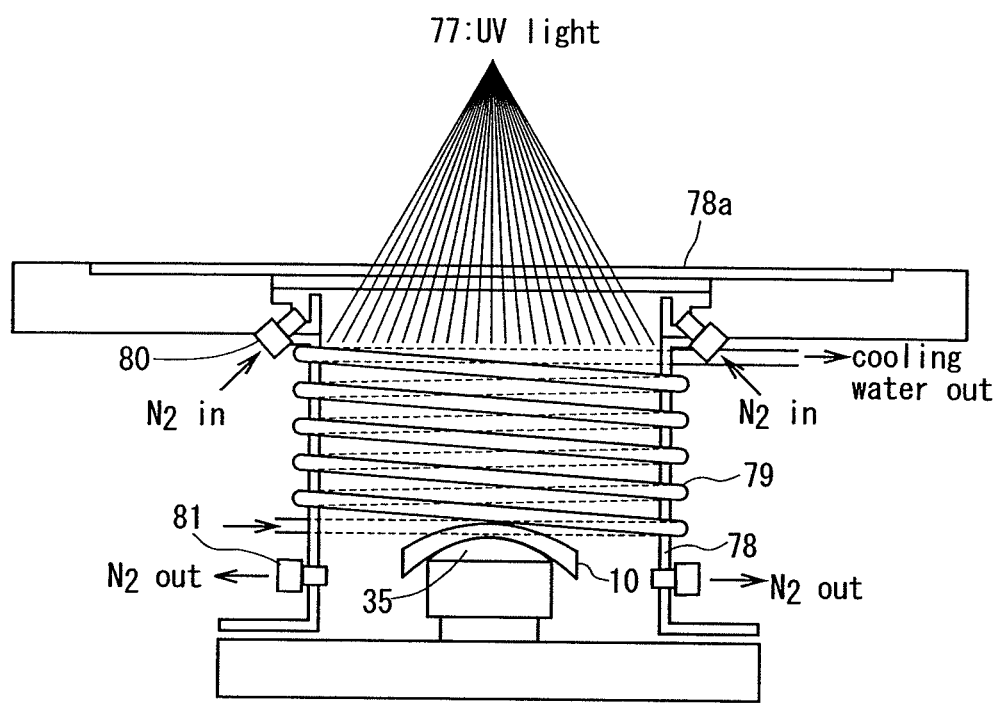
FIG. 15 is an enlarged side view of the UV device of FIG. 14.

A cylinder 78 surrounding the lens 10 and comprising stainless steel is provided below the UV light 77. A cooling pipe 79 wound in a coil is disposed on the periphery of the cylinder 78, and cooling water can circulate inside the cooling pipe 79. As shown in FIG. 15, gas supply ports 80 are provided in an upper portion of the cylinder 78 to be capable of introducing $N_2$, an inert gas, into the cylinder 78, and $N_2$ is discharged to the outside of the cylinder 78 through gas discharge ports 81 provided in a lower portion of the cylinder 78. A window 78a formed from borosilicate glass for transmission of UV light is provided in an upper portion of the cylinder 78, as shown in FIG. 15.

Figure 16:
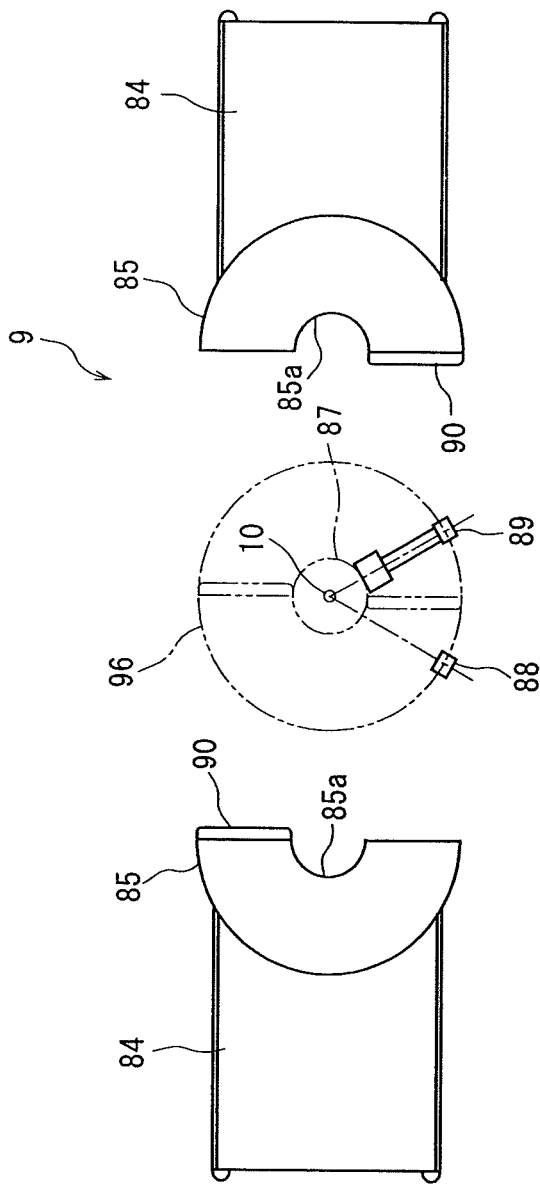
FIG. 16 is a plan view of a movable fluid receiving device in the photochromic coating apparatus of FIG. 1.
Figure 17:
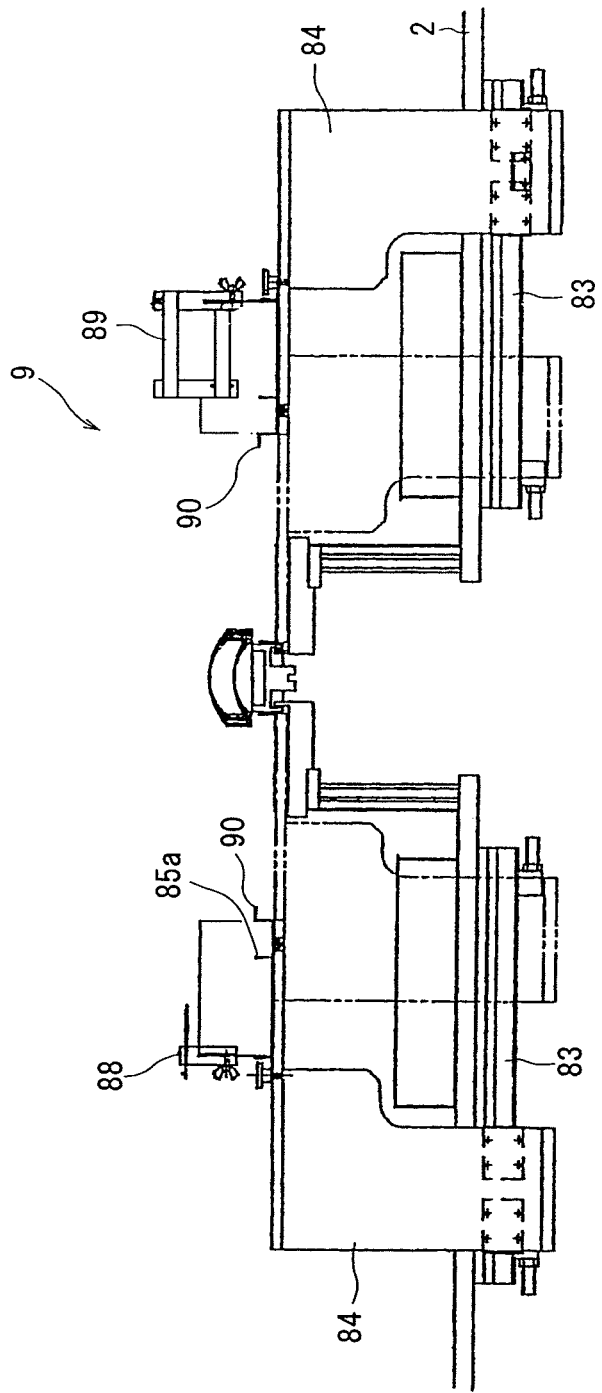
FIG. 17 is a side view of the movable fluid receiving device of FIG. 16.

FIGS. 16 and 17 show the movable fluid receiving device 9.

The movable fluid receiving device 9 has a pair of guide rails 83 provided on the back of the base stand 2, and a pair of movable units 84 provided at both ends of the lens support device 3 move back and forth, with the lens support device 3 being positioned therebetween. A pair of semicircular fluid receiving portions 85 are provided at an upper portion of the movable units 84. When the pair of fluid receiving portions 85 move forward, they are formed in an annular tubular shape to accept the coating fluid, which falls from the lens 10, between an outer tubular portion 86 and an inner tubular portion 87. The inner tubular portion 87 has an upper edge portion 85*a* disposed below the outer periphery of the lens 10.

A installing jig 88 for a temperature sensor, and a spatula fixing jig 89 for preventing the adhesion of the coating fluid onto the side surface of the lens 10 are provided at the outer tubular portion 86. The numeral 90 denotes a baffle plate for blocking a clearance at the junction between the fluid receiving portions 85.

The procedure for photochromic coating of the lens according to the present embodiment will be described below.

Figure 18:
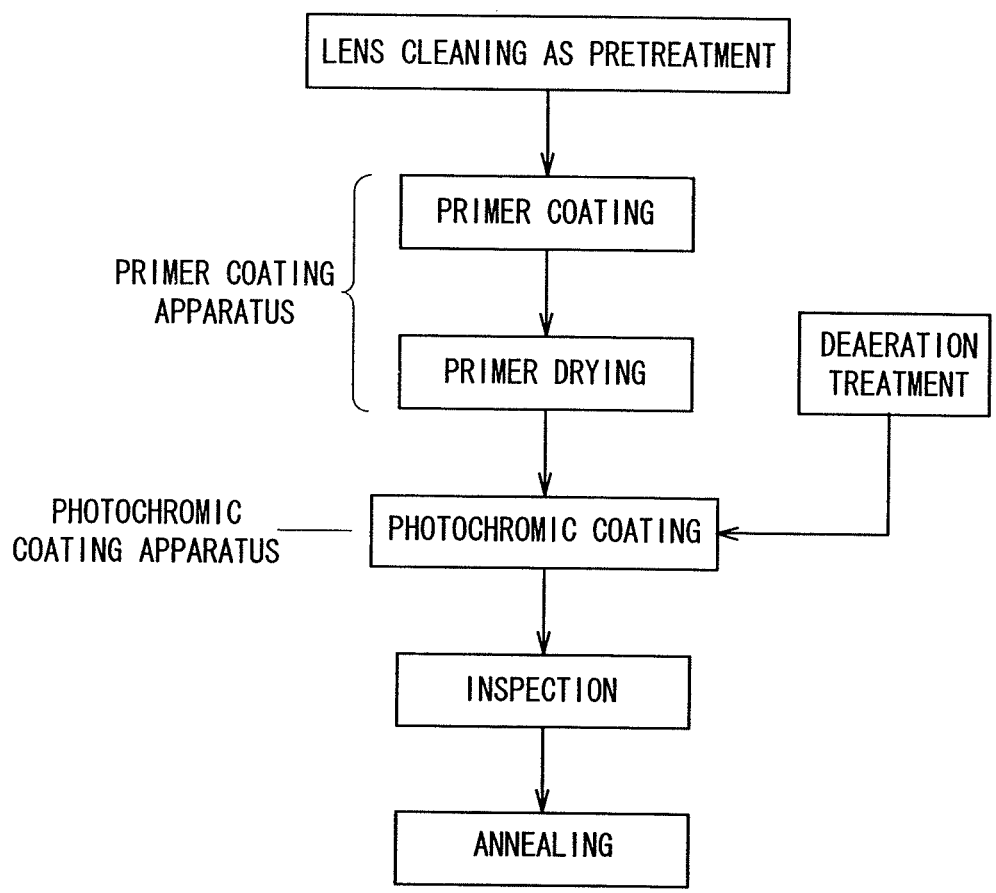
FIG. 18 is a flowchart of the coating apparatus for a lens.

FIG. 18 is a flowchart showing a manufacturing process for a photochromic spectacle lens.

A lens base material prepared from thiourethane resin is used as a base material, and cleaning of the lens 10 with an aqueous solution of an alkali or by ultrasonic cleaning is performed as pretreatment.

Then, before coating with the photochromic material, the surface of the lens 10 is coated with a urethane primer to improve the adhesion of the photochromic material. This operation is performed by linearly moving the nozzle, which ejects the coating fluid (the urethane primer), in the radial direction of the lens from the center of the upper surface of the lens to the edge of the upper surface of the lens while rotating the lens 10. Since the coating fluid (the urethane primer) has low viscosity, the coating fluid can be spread equally on the entire surface of the lens 10 by the centrifugal force of the rotated lens 10. Concretely, the rotational speed of the lens 10 during coating with the coating fluid (the urethane primer) is about 70 rpm. After coating with the coating fluid (the urethane primer), the lens 10 is rotated for 5 seconds or so at 1,000 rpm to adjust the film thickness. The thickness of the coating layer is, for example, 7 μm. These rotational speeds are varied according to the gradient of the lens 10 and the temperature around the lens 10, thereby adjusting the film thickness to an appropriate film thickness.

After the coating layer (the primer layer) is applied, the coating layer (the primer layer) is dried (solidified) for 15 minutes at room temperature. The coating layer comprising the urethane primer has the property of becoming solid when exposed to moisture. The operation performed up to this stage constitutes a primer coating step.

Then, the lens is subjected to a photochromic coating step. In this coating operation, as shown in FIG. 3, the lens 10 is set at the center of the lens support member 35 of the photochromic coating apparatus 1. Positioning of the lens 10 is performed by a centering device (not shown). After the lens 10 is positioned in the planar direction, the height position of the lens 10 and the edge (peripheral edge on the upper surface side of the lens) position of the lens 10 are determined by the lens height measuring sensor 6, as shown in FIGS. 10 and 11.

Determination of the height position is performed, with the lens 10 being held between the sensors 43*a*, 44*a* and the mirrors 43*b*, 44*b* of the sensor units 43, 44. When the lens support member 35 is raised from a lower position, laser light 43*c* from one sensor 43*a* located at the center position of the lens 10 is refracted by the lens 10. Thus, the laser light 43*c* does not reach the sensor 43*a*, so that the presence of the lens 10 is detected. In this state, laser light 44*c* from the sensor 44*a* of the other sensor unit 44 is reflected by the mirror 43*b* and reaches the sensor 44*a*, thus showing the absence of the lens 10. When the lens 10 is further raised, the laser light 44*c* hits the lens 10, and the laser light 44*c* emitted from the sensor 44*a* is blocked because of refraction of the laser light 44*c*. Thus, the presence of the lens 10 is recognized. In this manner, the center position (vertex) of the lens 10 and the height of an arbitrary position of the lens 10 other than the center are detected.

The position of the edge, which is the marginal portion of the lens 10, can be found by knowing the height position of the center of the lens 10, and detecting the gradient in the radial direction of the lens 10 (the height of the lens surface) by the other sensor unit 44. That is, a knowledge of the distance between two points enables the edge position to be calculated from the approximation expression $h'=H_0 D^2/4L^2$ (h': the height of the lens, $h_0$: the measured value of the height of the lens, D: the diameter of the lens, L: the distance between the sensors, normally 27 mm) with reference to FIG. 19B. The shape of the lens is circular or nearly circular before cutting of the lens, so that the diameter D of the lens can be found without problem. In this manner, the height of the lens 43 is adjusted to an appropriate height directly below the discharge orifice of the nozzle 24 of the coating unit 21.

After the lens 10 is positioned and its gradient is detected, a coating operation for the photochromic fluid is performed. As pretreatment for the coating operation, deaeration treatment of the coating unit 21 is carried out as shown in FIG. 8. That is, the drive motors 19 and 20 are driven, whereby the coating unit 21 is rotated about the axis of rotation 17 of the deaeration device 15 while being rotated about its own inclined axis 18. In preferred embodiments, the radius of rotation of the coating unit 21 about the axis of rotation 17 is 100 to 200 mm, and the rotational speed of this rotation is 600 to 2,000 rpm, whereas the rotational speed of the rotation of the coating unit 21 about its own axis 18 is 0 to 300 rpm.

Because of the rotation by such deaeration treatment, the coating fluid within the vessel 22 presses the valve ball 25 in opposition to the pressing force of the spring 26. As a result, the coating fluid enters the check valve 23, while air within the check valve 23 flows into the vessel 22.

It should be noted in the present invention that the deaeration treatment is performed, with the vessel 22 being mounted with the check valve 23. By so doing, the check valve 23, which has not been charged with the coating fluid, can be charged with the coating fluid free of air bubbles. In the check valve 23 already containing the coating fluid, the spring 26 is disposed in the check valve 23, and thus air is apt to enter between the twists of its coil. Since this air can be removed, great advantages are obtained. That is, the amount of the expensive photochromic fluid for air purge can be decreased, and deaeration can be reliably completed in a short time. In the coating operation, the lid 23*a* is detached from the check valve 23, and the ejection nozzle 24 is connected. Since the ejection nozzle 24 has not been deaerated, it is air-purged. However, its amount air-purged may be small, because its capacity is small. Furthermore, with the ejection nozzle 24 being connected to the check valve 23, the ejection nozzle 24 may be lidded, and deaerated. Air purge can be done in a small amount, or can be omitted.

There is a case where stirring and deaeration are performed for the coating fluid whose constituents have not been thoroughly uniformized. In this case, depending on the properties of the coating fluid, the coating fluid, which has not been fully stirred or uniformized, flows from the vessel 22 into the check valve 23 or the ejection nozzle 24, and is stirred and deaerated at respective sites. As a result, the composition of the coating fluid may be different at various sites in the interior of the vessel 22, the check valve 23, and the ejection nozzle 24. As a method of preventing this difference, the rotational speed of the drive motor 20 is decreased to reduce the revolution or the orbital motion of the vessel 22 on the revolution axis 17. With this state kept during the drive motor 19 is rotated to uniform the coating fluid, it can be possible to suppress the inflow of the nonuniform coating fluid into the check valve 23. After the coating fluid in the vessel 22 is sufficiently stirred, the rotational speed of the drive motor 20 is increased to flow the coating fluid into the check valve 23, whereby deaeration treatment can be performed. Alternatively, the coating fluid may be thoroughly stirred in a different container by other ordinary stirring means such as a planetary stirring deaeration device or an agitating blade, whereafter the coating fluid may be transferred into the vessel 22, and deaerated by the removal apparatus 15 of the present invention, although this procedure requires many steps.

By so rotating the rotating body 16 and the coating unit 21, the coating unit 21 makes revolution on the revolution axis 17 and rotation on the rotation axis 18 at the same time, thereby performing stirring and deaeration of the coating fluid within the coating unit 21. Further, the photochromic coating fluid having high viscosity can be uniformized.

The coating unit 21, which has finished deaeration treatment, is supported by the coating unit support device 4 shown in FIGS. 4 and 5, and the nozzle 24 of the coating unit 21 is disposed directly above the lens 10. The lens 10 is supported on the lens support member 35 while being rotated (about 100 rpm). In the coating unit 21, the vessel 22 is tilted to fix the nozzle 24 at the central position of the lens 10. The plunger 27 of the coating unit 21 presses the coating fluid to open the check valve 23, thereby ejecting the coating fluid onto the surface of the lens 10 through the nozzle 24. In this ejection operation, as indicated by imaginary lines in FIG. 4, the coating unit 21 is inclined to set the tip of the nozzle 24 at the central position of the lens 10 (a position on the axis of rotation of the lens 10 and about 1 mm above the surface of the lens 10). In this state, the coating fluid is ejected onto the surface of the lens 10.

Simultaneously, the film 64 of the coating film uniformizing device 7 is moved and pressed against the lens surface. In this state, the film 64 is moved in a linear trajectory from the center of the lens 10 to the edge of the lens 10. This is because the photochromic coating fluid has great viscosity and does not spread under centrifugal force due to the rotation of the lens 10. Thus, the coating fluid is spread to the entire surface of the lens 10 by the rotational force of the lens 10 and the linear movement of the film 64. The reason why the nozzle 24 is inclined is that interference between the film 64 and the nozzle 24 is prevented by the inclination. The nozzle 24 may have the tip bent in an L-shape to avoid interference with the film 64. As described earlier, the coating unit is rotated beforehand on the revolution axis 17 and is rotated on the rotation axis 18 to carry out deaeration. Thus, no air bubbles are contained in the coating fluid, and the whole of the coating fluid is rendered uniform, so that a uniform coating film free from air bubbles and film thickness irregularities can be obtained.

At this stage, the amount of the photochromic coating fluid on the lens 10 is larger than the film thickness of the desired photochromic film, thus making it necessary to remove the surplus coating fluid on the lens 10 until the desired amount of the fluid is attained. Thus, an operation for rotating the lens 10 to spin off the coating fluid on the lens 10 is performed. The rotational speed of the lens 10 is determined by conditions conformed to the temperature inside the apparatus and the gradient of the lens 10. For example, the lens 10 is spun at 600 rpm.

Then, the lens 10 is surrounded by the cylinder 78 of the UV device 78, and the interior of the cylinder 10 is purged with nitrogen. The reason for providing a nitrogen atmosphere is that in the presence of oxygen, the coating film minimally cures. The UV lamp 77 is brought to an appropriate height position, and the coating film is cured by the UV lamp 77. The window 78*a* installed between the UV lamp 77 and the lens 10 allows UV light to be transmitted into the cylinder 78, and also plays the role of a filter for screening out light of a wavelength in the vicinity of 300 nm or shorter.

The reason for cutting off the wavelength in the vicinity of 300 nm or shorter is that depending on the type of the photochromic coating fluid, the coating film is wrinkled, and a uniform film is not obtained. The reason why borosilicate glass is used as the material is that this material is heat-resistant and does not break under heat of the UV lamp.

After completion of photochromic coating, the photochromic coating layer is inspected for the state of adhesion. The coating layer poorly adhered is rejected, and a good product is subjected to annealing treatment. This treatment is heat treatment performed for 1 hour at 110° C.

In this manner, the photochromic coating layer is formed on the lens 10. This coating layer is the one obtained after air is removed by the removal apparatus 15, and the coating fluid is deaerated and stirred not only in the vessel 22, but also in the check valve 23 (or, also including the ejection nozzle 24). Thus, the coating unit 21 as a whole ensures coating with a uniform coating fluid free from concentration unevenness. Consequently, a high quality photochromic lens can be produced.

The embodiment of the present invention has been described above, but needless to say, various modifications or changes of the present invention are possible based on the technical ideas of the present invention.

For example, in connection with the sensor units 43, 44, the line connecting the sensor 43*a* and the mirror 43*b* is located at the same horizontal height position as the line connecting the other sensor 44*a* and the other mirror 44*b*, but one of the sensors may be located at a different height position to provide a height difference between the two sensors. In this case, the edge position of the lens 10 is determined in consideration of the height difference between the sensors.

According to the embodiment of the present invention, photochromic coating is taken as an example. However, the present invention can be applied to other coating technologies.

The spectacle lens having a convex surface and a concave surface has been coated, but the present invention can be applied to coating of glass having flat surfaces.

The removal method for entrained air according to the present invention comprising the steps of:

(A) preparing a coating unit comprising a cylindrical vessel storing the coating fluid and a check valve for preventing back-flow of the coating fluid connecting with the vessel;

(B) plugging an outlet of the coating fluid existing downstream of the check valve; and (C) rotating the coating unit on an axis of the vessel and orbiting the coating unit on a revolution axis simultaneously whereby introducing the coating fluid into the check valve, discharging air inside the check valve toward the vessel, and further removing air incorporated in the coating fluid from the coating fluid. By thus removing air incorporated in the check valve, air bubbles are not contained in the coating layer, and a uniform layer free from film thickness unevenness can be obtained. Nor is it necessary to perform air purge with the coating fluid, as done conventionally, so that a saving in the coating fluid can be made. The use of the check valve makes it possible to prevent fluid drip of the coating fluid, and form a stable coating film.

In the above removal method for entrained air, the coating unit prepared in the step (A) can further contain an ejection nozzle for ejecting the coating fluid connecting with the check valve and the plugging in the step (B) can be carried out by plugging an outlet of the ejection nozzle. Thus, entrained air in the ejection nozzle can also be removed, and a more stable coating film can be formed.

In the above removal method for entrained air wherein a rotational speed of revolution of the coating unit is set such that the speed in a late stage of a rotating operation is rendered higher than the speed in an early stage of the rotating operation, if stirring of the respective components of the coating fluid is not sufficient, or if the properties of the coating fluid render stirring difficult, the coating fluid can be stirred sufficiently, and the coating fluid can be uniformized.

Further, the coating fluid used in the above invention is a photochromic coating fluid to be coated on the surface of spectacles. Thus, a photochromic coating film of good quality can be formed on the surface of spectacles.

The removal apparatus for entrained air according to the present invention comprises a casing which can rotate on a rotation axis and also can orbit on revolution axis, and a coating unit comprising a cylindrical vessel accommodating a coating fluid inside, a check valve for preventing back-flow of the coating fluid connecting the vessel and a lid for plugging an outlet of the coating fluid existing downstream of the check valve; wherein the rotation axis being located, with respect to the revolution axis, outwardly and downwardly in a circumferential direction of an orbital on the revolution axis, the coating unit being supported by the casing detachably such that the lid of the coating unit is located below, and the coating unit being rotated on the rotation axis and being orbit on the revolution axis simultaneously with the casing, to deaerate air contained in the coating fluid. Thus, air bubbles are not contained in the coating layer, and a uniform layer free from film thickness unevenness can be obtained by using the apparatus. Nor is it necessary to perform air purge with the coating fluid, as done conventionally, so that a saving in the coating fluid can be made.

When the lid on the check valve is detached, the ejection nozzle is connected to the check valve, and then a lid is mounted on a tip portion of the ejection nozzle, it is possible to remove entrained air in the ejection nozzle and to form a more stable coating film.

In the removal apparatus for entrained air according to the present invention, the coating fluid is a photochromic coating fluid to be coated on the surface of spectacles. Thus, a photochromic coating film of good quality can be formed on the surface of spectacles.

In the removal apparatus for entrained air, the flange facing outward is formed on the vessel, and the flange is detachably mounted on the casing. Thus, the vessel can be fixed easily and reliably, and the vessel can be rotated stably.

I claim:

1. A method for removing air from a photochromic coating fluid containing entrained air comprising the steps of:
   (A) preparing a coating unit comprising a cylindrical vessel storing the photochromic coating fluid, a check valve connecting with the vessel and an outlet of the photochromic coating fluid existing downstream of the check valve, wherein the check valve prevents back flow of the photochromic coating fluid from the outlet toward the vessel by urging a valve hail against a valve seat by a spring,
   (B) plugging the outlet; and
   (C) after step (B), rotating the coating unit on an axis of the vessel and orbiting the coating unit on a revolution axis simultaneously whereby the photochromic coating fluid within the vessel presses the valve ball in opposition to the pressing force of the spring and the photochromic coating fluid enters the check valve, while air within the check valve flows into the vessel, and further removing air incorporated in the photochromic coating fluid from the photochromic coating fluid.

2. The method according to claim 1, wherein the coating unit prepared in the step (A) further contains an ejection nozzle for ejecting the photochromic coating fluid connecting with the check valve, the plugging in the step (B) is carried out by plugging an outlet of the ejection nozzle, and the photochromic coating fluid is introduced into the check valve and the ejection nozzle, and the air inside the check valve and the air inside the ejection nozzle are discharged toward the vessel in the step (C).

3. The method according to claim 1, wherein a rotational speed of revolution of the coating unit is set such that the speed in a late stage of a rotating operation is rendered higher than the speed in an early stage of the rotating operation.

4. The method according to claim 1, wherein the photochromic coating fluid is a photochromic coating fluid to be coated on a surface of spectacles.

5. The method according to claim 1, wherein the check valve has a first small-diameter portion on its upper end side connected to the vessel, a large-diameter portion at its center, and a second small-diameter portion at the leading end side thereof; and a valve seat, where a cushioning material is disposed, is formed at the boundary between the first small-diameter portion and the large-diameter portion and a valve hall of a spherical shape is disposed in the large-diameter portion, and a spring is disposed in a compressed state between the valve ball and the second small-diameter portion.

6. The method according to claim 1, wherein the rotational speed of the revolving axis suppresses the inflow of the photochromic coating fluid into the check valve and stirs the photochromic coating fluid, and after stirring, the rotational speed of the drive motor is increased to inflow the photochromic coating fluid into the check valve.

* * * * *